(12) United States Patent
Hebiguchi et al.

(10) Patent No.: US 8,180,288 B2
(45) Date of Patent: May 15, 2012

(54) COMMUNICATION SYSTEM (75) Inventors: Hiroyuki Hebiguchi, Miyagi-ken (JP);
Masahito Nakamura, Miyagi-ken (JP);
Yoshiharu Saito, Miyagi-ken (JP);
Daichi Inoue, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 171 days.

(21) Appl. No.: 12/559,380

(22) Filed: Sep. 14, 2009

(65) Prior Publication Data

US 2010/0003917 A1    Jan. 7, 2010

Related U.S. Application Data (63) Continuation of application No. PCT/JP2008/054755, filed on Mar. 14, 2008.

(30) Foreign Application Priority Data

Mar. 16, 2007   (JP) .................................. 2007-069265
May 8, 2007     (JP) .................................. 2007-123588

(51) Int. Cl.
     *H04B 5/00*        (2006.01)
(52) U.S. Cl. ..................................................... 455/41.1
(58) Field of Classification Search .................. 455/41.1
     See application file for complete search history.

(56) References Cited

U.S. PATENT DOCUMENTS

| 7,333,786 | B2 * | 2/2008 | Kikuchi et al. | 455/130 |
| 2007/0099589 | A1 * | 5/2007 | Kawai | 455/269 |
| 2007/0184788 | A1 * | 8/2007 | Minotani et al. | 455/117 |

FOREIGN PATENT DOCUMENTS

| JP | 2005-94466 | 4/2005 |
| JP | 2008-53917 | 3/2008 |

OTHER PUBLICATIONS

Search Report dated May 20, 2008 from International Application No. PCT/JP2008/054755.

* cited by examiner

*Primary Examiner* — Temesgh Ghebretinsae
*Assistant Examiner* — David Bilodeau
(74) *Attorney, Agent, or Firm* — Beyer Law Group LLP

(57) ABSTRACT

A communication system according to the present invention includes a transmitter for applying a transmission signal to a human body as an electric field, and a receiver for receiving the transmission signal by detecting the electric field via the human body. The receiver includes a reception electrode which faces the human body, a resonance circuit formed of a resonance inductor and a resonance capacitor, and a coupling capacitor for capacitively coupling the reception electrode and the resonance circuit.

9 Claims, 12 Drawing Sheets

AC POWER SOURCE
FREQUENCY: 10 MHz
AMPLITUDE: 1 Vpp

COMMUNICATION SYSTEM

CLAIM OF PRIORITY

This application is a Continuation of International Application No. PCT/JP2008/054755 filed on Mar. 14, 2008, which claims benefit of Japanese Patent Application Nos. 2007-069265 and 2007-123588 filed on Mar. 16, 2007 and May 8, 2007, respectively, which are all hereby incorporated by reference.

BACKGROUND OF THE INVENTION

1. Field of the Invention

The present invention relates to a communication system for transmission/reception via a transmission medium such as a human body.

2. Description of the Related Art

Accompanied with the recent technical development, the totally new communication method using the electric field guided to a transmission medium such as the human body has been proposed. A receiver of the aforementioned communication system as disclosed in Japanese Unexamined Patent Application Publication No. 2005-94466 includes a reception electrode for receiving a signal generated from a signal source, and a resonance circuit for extracting the signal at a prescribed frequency. The resonance circuit formed of an air-core coil and a chip capacitor has an end of the air-core coil connected to the reception electrode which faces the human body.

In the communication system disclosed in Japanese Unexamined Patent Application Publication No. 2005-94466, if the distance between the human body and the reception electrode of the receiver extends by a very small amount, the communication will be disabled or interfered owing to the noise close to the carrier frequency of the communication (for example, the noise generated by the mobile phone).

SUMMARY OF THE INVENTION

The present invention provides a communication system which allows the stable communication irrespective of the extended distance between the transmission medium and the reception electrode while preventing the malfunction caused by the noise.

The communication system according to the present invention is provided with a transmitter for applying a transmission signal to a transmission medium as an electric field, and a receiver for receiving the transmission signal by detecting the electric field via the transmission medium. The receiver includes a reception electrode located opposite the transmission medium, a resonance circuit formed of a resonance inductor and a resonance capacitor, and a coupling capacitor for capacitively coupling the reception electrode and the resonance circuit.

The aforementioned structure is provided with a coupling capacitor for capacitively coupling the reception electrode and the resonance circuit, which ensures the stable communication irrespective of the extended distance between the transmission medium and the reception electrode while preventing the malfunction caused by the noise.

In the communication system according to the present invention, preferably, the coupling capacitor has a capacitance which is equal to or smaller than a value of a capacitance between the receiver and the transmission medium when the receiver moves away from the transmission medium up to a maximum distance within which the receiver can perform communication. The structure reduces the coupling capacitance between the receiver and the transmission medium to extend the distance between the transmission medium and the reception electrode, which allows the communication therebetween.

In the communication system according to the present invention, preferably, the coupling capacitor is of variable capacitance type. The aforementioned structure is capable of controlling the distance between the transmission medium and the reception electrode, which allows the user to set the distance between the transmission medium and the reception electrode within which the receiver can perform communication by his/her own intention.

In the communication system according to the present invention, preferably, the resonance circuit includes plural resonance inductors capacitively coupled with the reception electrode. The aforementioned structure is capable of reducing the frequency shift amount caused by the fluctuation of the distance between the transmission medium and the reception electrode. The distance between the transmission medium and the reception electrode may further be extended.

In the communication system according to the present invention, preferably, each of the plural resonance inductors has a switching member, respectively. The aforementioned structure is capable of changing the resonance frequency of the resonance circuit.

In the communication system according to the present invention, preferably, the resonance circuit includes the plural resonance capacitor, and each of the resonance inductors and/or the resonance capacitors has a switching member. The aforementioned structure allows the resonance circuit to control the inductance and the capacity individually so as to change not only the resonance frequency but also the Q-value.

In the communication system according to the present invention, preferably, the coupling capacitor is formed between a first electrode at the reception electrode side and a second electrode at the resonance circuit side, and at least one of the first electrode and the second electrode is formed on a circuit substrate on which the resonance circuit is formed.

The aforementioned structure is capable of suppressing the number of components to be used by forming the coupling capacitor on the substrate.

In the communication system according to the present invention, preferably, the demodulation circuit side wiring, the ground side wiring, and the first electrode at the reception electrode side are formed on the circuit substrate. The coupling capacitor is formed between the first electrode at the reception electrode side and the resonance circuit. Preferably, the first electrode at the reception electrode side is formed on the circuit substrate on which the resonance circuit is formed, and the resonance inductor is located at the position opposite the first electrode at the reception side electrode.

In the structure, one electrode of the coupling capacitor serves as the resonance inductor. So the coupling capacitor and the resonance inductor may be distribution-constant coupled. As a result, the frequency shift amount may further be reduced, thus extending the distance within which the receiver can perform communication. Furthermore, the aforementioned structure is capable of establishing the distribution-constant coupling between the coupling capacitor and the resonance inductor without increasing the number of components.

In the communication system according to the present invention, preferably, the demodulation circuit side wiring and the ground side wiring are formed such that such that a capacitance between the first electrode and the demodulation circuit wiring becomes larger than the capacitance between the first electrode and the ground side wiring. The aforementioned structure prevents the signal from the reception electrode from being drawn into the ground, resulting in the improved sensitivity.

The communication system according to the present invention is provided with a transmitter for applying a transmission signal to a transmission medium as an electric field, and a receiver for receiving the transmission signal by detecting the electric field via the transmission medium, wherein the receiver includes a reception electrode located opposite the transmission medium, a resonance circuit formed of a resonance inductor and a resonance capacitor, and a coupling capacitor for capacitively coupling the reception electrode and the resonance circuit. The structure ensures the stable communication irrespective of the extended distance between the transmission medium and the reception electrode while preventing malfunction caused by the noise.

BRIEF DESCRIPTION OF THE DRAWINGS

FIGS. 13A to 13C show structures of the receiver in the communication system according to the example of the present invention, wherein

FIGS. 14A and 14B show structures of the receiver in the communication system according to the example of the present invention, wherein

DESCRIPTION OF THE PREFERRED EMBODIMENTS

The inventor has been trying to solve the technical problems disclosed in Japanese Unexamined Patent Application Publication No. 2005-94466, that is, the communication is disabled by the extended distance between the transmission medium and the reception electrode, and malfunction is caused by the noise. The inventor found that the shift of the resonance frequency of the resonance circuit in the receiver, which is caused by the change in the capacitance between the transmission medium and the reception electrode of the receiver opposite the transmission medium disables the communication resulting from the extended distance between the transmission medium and the reception electrode. The inventor also found that when the resonance feature of the resonance circuit is broadened to make the Q-value small to prevent the large change in the gain irrespective of the shift of the resonance frequency, the malfunction occurs under the influence of the noise close to the frequency of the carrier wave of the transmission signal. In view of the aforementioned findings, the inventor invented the communication system which employs the coupling capacitor for capacitively coupling the reception electrode and the resonance circuit to establish the stable communication irrespective of the extended distance between the transmission medium and the reception electrode while preventing the malfunction caused by the noise.

The present invention provides a communication system which includes a transmitter for applying a transmission signal to a transmission medium as the electric field, and a receiver for receiving the transmission signal by detecting the electric field via the transmission medium. In the communication system, the receiver includes a reception electrode opposite the transmission medium, a resonance circuit formed of a resonance inductor and a resonance capacitor, and a coupling capacitor for capacitively coupling the reception electrode and the resonance circuit for the stable communication irrespective of the extended distance between the transmission medium and the reception electrode while preventing the malfunction caused by the noise.

An example according to the present invention will be described in detail referring to the accompanying drawings.

Figure 1A:
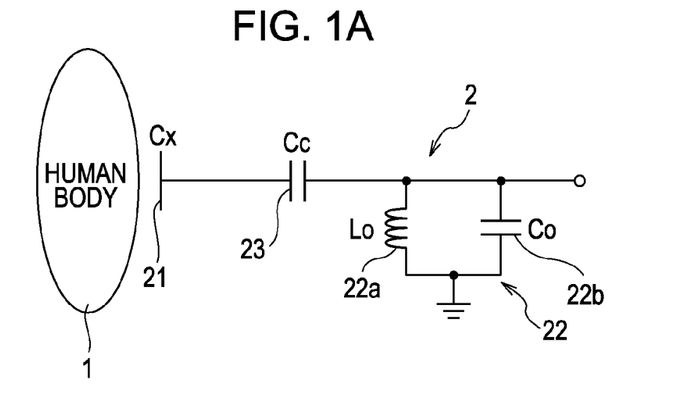
FIG. 1A is a view schematically showing a part of a communication system at a receiver side according to an example of the present invention.
Figure 1B:
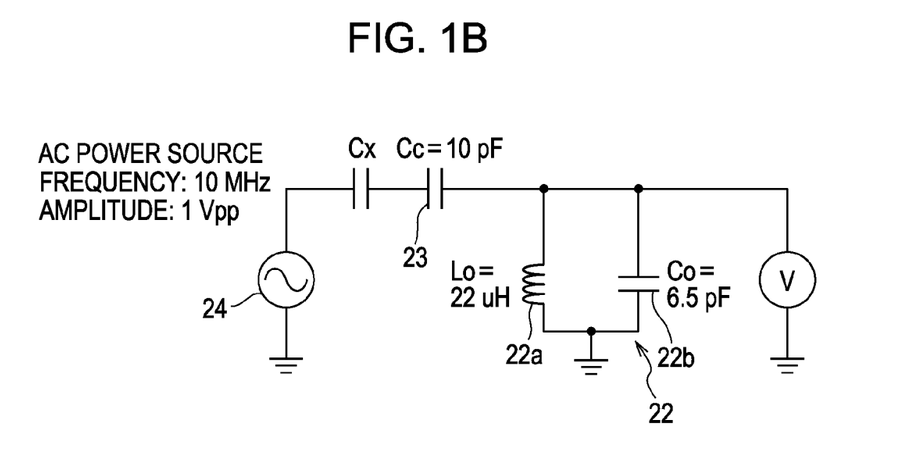
FIG. 1B is a view showing an equivalent circuit as a part of the communication system at the receiver side shown in FIG. 1A.

FIG. 1A is a view schematically showing a structure of a part of a communication system at a receiver side according to an example of the present invention. FIG. 1B is a view showing an equivalent circuit as a part of the communication system at the receiver side shown in FIG. 1A. The communication system shown in FIG. 1A is mainly formed of a transmission medium such as a human body 1 for transmitting a transmission signal via the electric field, a transmitter (not shown) for applying the transmission signal having an information signal modulated to the transmission medium as the electric field, and a receiver 2 for detecting the transmission signal indicating the electric field change via the transmission medium to demodulate the electric field change into the information signal.

In the communication system, the transmitter and the transmission medium (human body 1), and the receiver 2 and the transmission medium (human body 1) are capacitively coupled electrically via a capacitor (capacity Cx between the receiver 2 and the transmission medium 1) such that the modulated transmission signal is transmitted to the transmission medium as the electric field. In the aforementioned case, the transmission medium allows the displacement current to flow, but does not allow the stationary current to flow, requiring no need of electric continuity. In the case where the transmitter is kept in the pocket, the transmitter and the transmission medium may be capacitively coupled via the thin cloth, which makes it possible to transmit the transmission signal.

The transmitter applies the modulated transmission signal to the transmission medium as the electric field. The transmitter includes a modulation circuit for modulating the information signal with the carrier, and a conversion circuit for amplifying the modulated signal into the transmission signal so as to be converted into the signal indicating the voltage change. Various modulation methods such as FM, AM, FSK, ASK, and PSK may be employed.

The receiver 2 detects the change in the electric field via the transmission medium to obtain the demodulated signal corresponding to the transmission signal. The receiver 2 located opposite the transmission medium includes a reception electrode 21 which receives the electric field from the transmission medium, a resonance circuit 22 formed of a resonance inductor 22a (inductance: Lo) and a resonance capacitor 22b (capacity: Co), and a coupling capacitor 23 (capacity: Cc) for capacitively coupling the reception electrode 21 and the resonance circuit 22. The rear stage of the resonance circuit 22 is connected to a detection circuit (not shown) for detecting the amplified electric field, and a demodulation circuit (not shown) for demodulating the transmission signal using the detected physical quantity.

The coupling capacitor 23 suppresses the shift of the resonance frequency of the resonance circuit 22, which is caused by the change in the capacitance between the transmission medium and the reception electrode 21 opposite the transmission medium. Preferably, the coupling capacitor 23 has the capacitance equal to or smaller than the capacitance value between the receiver 2 and the human body 1 when the receiver 2 moves away from the human body 1 up to the maximum distance within which the receiver can perform communication. This makes it possible to make the coupling capacity between the receiver 2 and the human body 1 small, thus extending the distance between the transmission medium and the reception electrode within which the receiver can perform communication. Preferably, the coupling capacitor 23 is of variable capacity type. This makes it possible to control the distance between the receiver 2 and the human body 1, or the distance between the transmission medium and the reception electrode. As a result, the user is capable of arbitrarily or automatically setting the distance between the transmission medium and the reception electrode within which the receiver can perform communication in accordance with the environment for the use of the transmitter/receiver.

Upon communication with the above-structured communication system, the information signal is modulated with the carrier at the frequency (several tens kHz to several MHz) indicating the conductivity by the transmitter for providing the modulated signal to the human body 1. The modulated signal is then amplified and converted into the voltage change signal. The voltage change is added to the electrode of the transmitter to generate the electric field corresponding to the modulated signal around the electrode. The resultant electric field is applied to the human body 1 as the transmission signal. The electric field (transmission signal) applied to the human body 1 is received by the reception electrode 21 of the receiver 2. Upon application of the electric field (transmission signal) to the reception electrode 21, the resonance circuit 22 and the detection circuit (not shown) at the rear stage thereof detect the modulated signal. A demodulation circuit (not shown) located at the rear stage of the detection circuit demodulates the signal with the carrier used in the transmitter to provide the information signal so as to be transmitted/received via the human body as the transmission medium.

It is assumed that an LC parallel resonance circuit (half bandwidth is approximately ±0.3 MHz) has the resonance frequency of the resonance circuit 22 adjusted to 10 MHz in the state where the capacitance Cx between the human body 1 and the reception electrode 21 is 10 pF (assumed to be in the normal state). In the aforementioned state, the capacitance Cx is decreased to reach the value at which the output amplitude at 10 MHz becomes half the value in the normal state, and such value is set to the allowable capacitance Cx. The relationship between the allowable capacitance Cx and the coupling capacitor Cc is shown in FIG. 2.

In the circuit disclosed in Japanese Unexamined Patent Application Publication No. 2005-94466, which has no coupling capacitor, the allowable capacitance Cx is 9.45 pF which allows the Cx fluctuation by only approximately 5% from the value of 10 pF in the normal state where the resonance frequency of the resonance circuit is adjusted. Supposing that the electrode area is set to 12 cm2 (4 cm×3 cm), the Cx of 10 pF corresponds to the gap of 1 mm between the human body and the reception electrode. Accordingly, the allowable capacitance Cx of 9.45 pF corresponds to the gap of 1.12 mm, which allows the fluctuation of only 0.12 mm (120 μm) as the gap difference for enabling the communication. In the circuit disclosed in Japanese Unexamined Patent Application Publication No. 2005-94466, the communication will be disabled if the gap becomes equal to or larger than 1.12 mm. The use of such circuit in the communication system according to the present invention may make the communication unstable.

Figure 2:
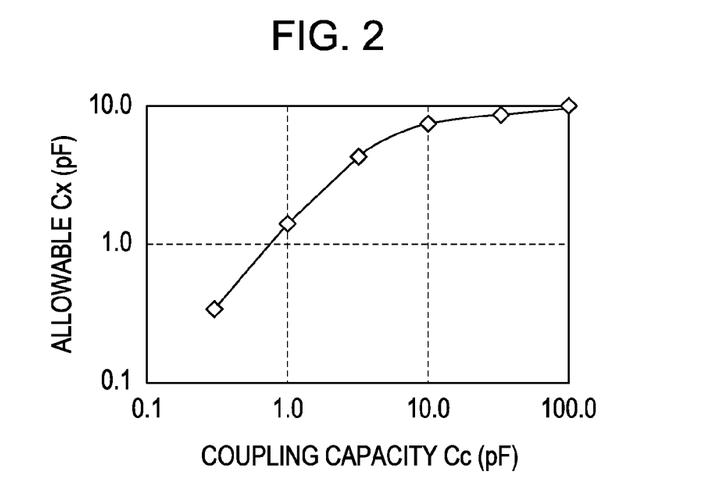
FIG. 2 is a view showing a relationship between the allowable Cx and a capacity Cc of the coupling capacitor.

Meanwhile, as shown in FIG. 2, in the structure of the present invention shown in FIG. 1B, the allowable capacitance Cx becomes 1.5 pF when the value of the coupling capacitor Cc 23 is 1 pF, which allows the fluctuation up to ⅙ of the value of 10 pF in the normal state. The allowable capacitance Cx of 1.5 pF corresponds to the gap of approximately 7 mm supposing that the electrode area is 12 cm2 (4 cm×3 cm). The allowable capacitance Cx is 0.4 pF when the value of the coupling capacitor Cc 23 is 0.3 pF, which corresponds to the gap of approximately 26 mm supposing that the electrode area is 12 cm2 (4 cm×3 cm). The aforementioned values are obtained by the adjustment on the assumption that the Cx value is equal to 10 pF. The Cx value in the normal state may be changed to adjust the distance within which the receiver can perform communication.

Figure 3:
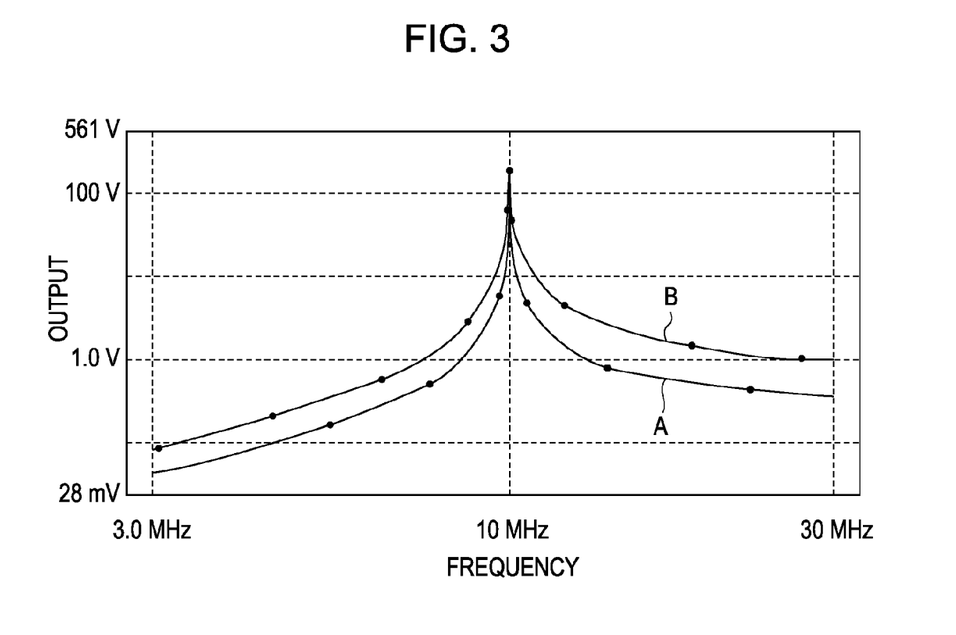
FIG. 3 is a view showing the shift of the resonance frequency in the receiver.

The resonance frequency shift suppressing effect in the receiver of the communication system according to the present invention will be described. The circuit shown in FIG. 1B is used for the simulation, and the result is shown in FIG. 3. In the circuit (example) shown in FIG. 1B, the frequency of the AC power source 24 was set to 10 MHz, the amplitude was set to 1 Vpp, the capacity of the coupling capacitor Cc 23 was set to 10 pF, and the inductance of the resonance inductor in the resonance circuit 23 was set to 22 μH, respectively. Assuming that the capacitance Cx between the human body 1 and the reception electrode 21 is set to 10 pF in the normal state, the capacity of the resonance capacitor is set to 6.5 pF such that the resonance frequency becomes 10 MHz.

Referring to FIG. 1B, the circuit which is not provided with the coupling capacitor was subjected to the simulation, and the results are shown in FIG. 3 as the comparative example. In the circuit with no coupling capacitor (comparative example), the frequency of the AC power source 24 was set to 10 MHz, the amplitude was set to 1 Vpp, and the inductance of the resonance inductor in the resonance circuit 23 was set to 22 µH, respectively. Assuming that the capacitance Cx between the human body 1 and the reception electrode 21 is set to 10 pF in the normal state, the capacity of the resonance capacitor set to 1.5 pF such that the resonance frequency becomes 10 MHz.

Figure 4:
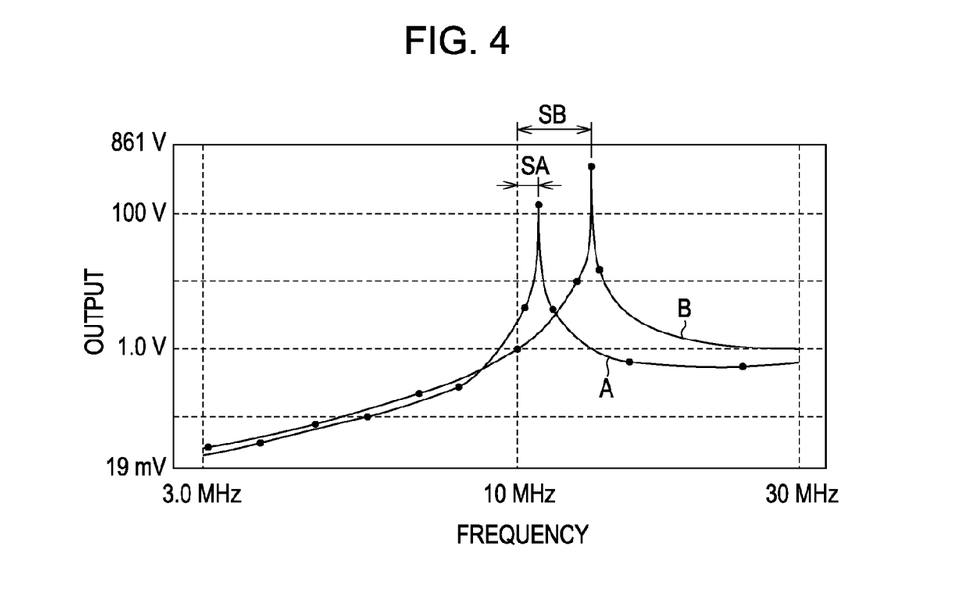
FIG. 4 is a view showing the shift of the resonance frequency in the receiver.
Figure 5:
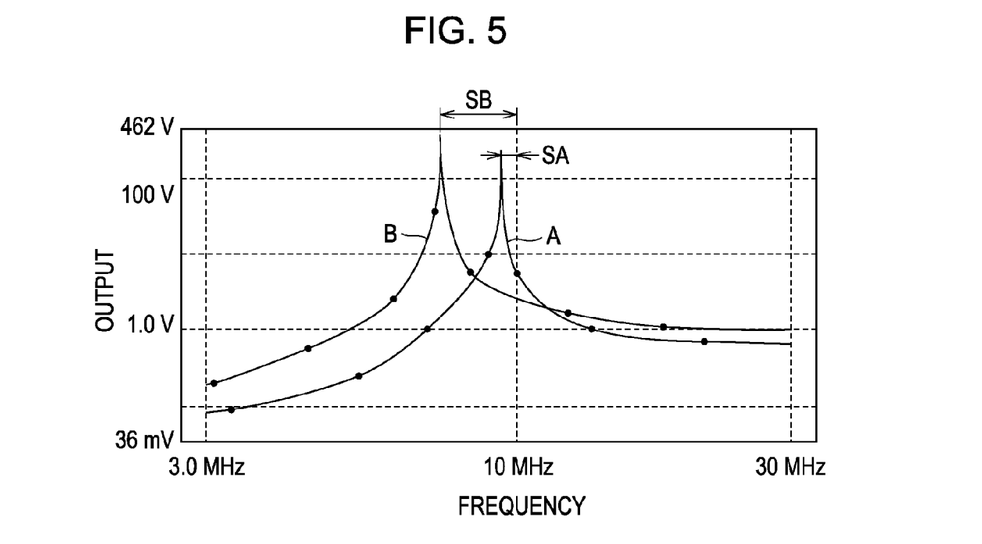
FIG. 5 is a view showing the shift of the resonance frequency in the receiver.

Referring to FIG. 3, in both of the circuit according to the example (characteristic curve A) and the circuit as the comparative example (characteristic curve B), resonance occurs at 10 MHz when the capacitance Cx is 10 pF. FIG. 4 shows each resonance frequency shift with the capacitance Cx set to 5 pF (gap larger than the one in the normal state) in both of the circuit according to the example and the circuit as the comparative example. Referring to FIG. 4, the circuit according to the example (characteristic curve A) suppresses the frequency shift SA to 10.8 MHz (8%). Meanwhile, the circuit as the comparative example (characteristic curve B) has the frequency shift SB as large as 13.3 MHz (33%). FIG. 5 shows each resonance frequency shift with the capacitance Cx set to 20 pF (gap smaller than the one in the normal state) in both of the circuit according to the example and the circuit as the comparative example. Referring to FIG. 5, the circuit according to the example (characteristic curve A) suppresses the frequency shift SA to 9.3 MHz (−7%). Meanwhile, the circuit as the comparative example (characteristic curve B) has the frequency shift SB as large as 7.3 MHz (−27%).

The circuit shown in FIG. 1B has the resonance circuit 22 formed as the parallel resonance circuit. When the series resonance circuit is used as the resonance circuit, the coupling capacitor 23 may suppress the resonance frequency shift as well.

Figure 6:
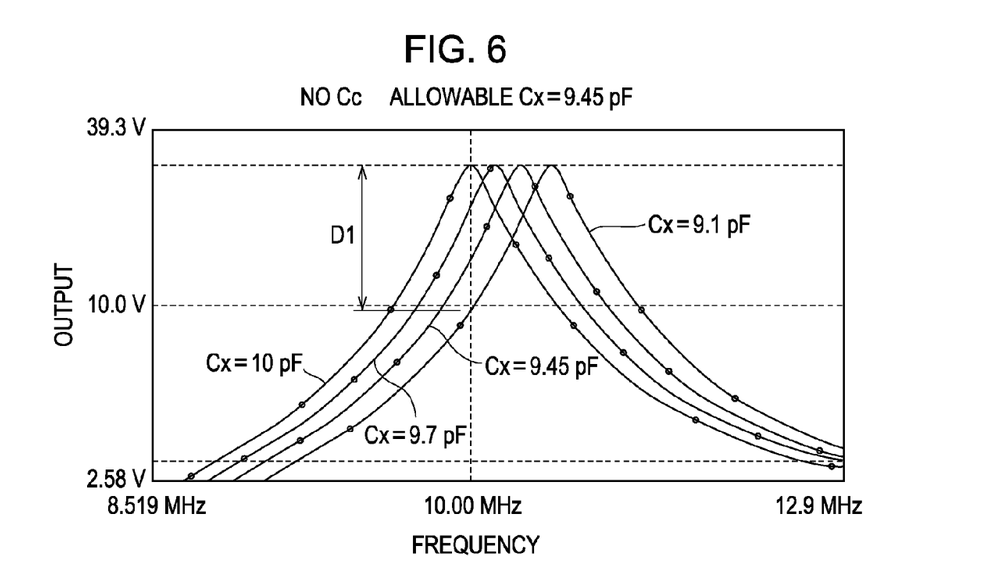
FIG. 6 is a view showing an output change caused by the fluctuation in the capacitance Cx of the receiver.
Figure 7:
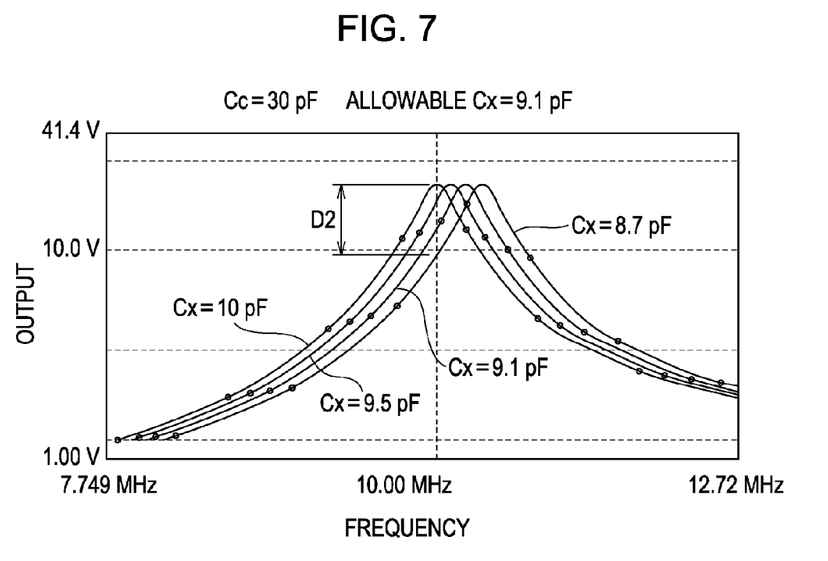
FIG. 7 is a view showing the output change caused by the fluctuation in the capacitance Cx of the receiver.
Figure 8:
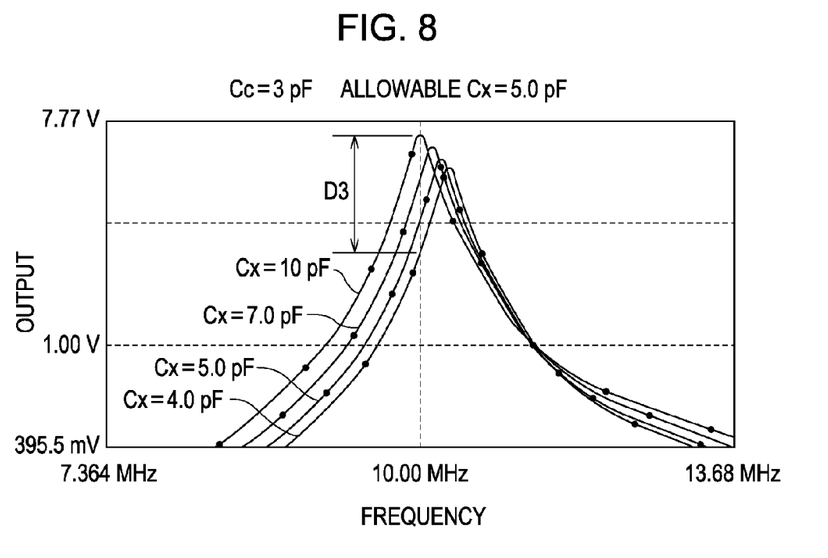
FIG. 8 is a view showing the output change caused by the fluctuation in the capacitance Cx of the receiver.
Figure 9:
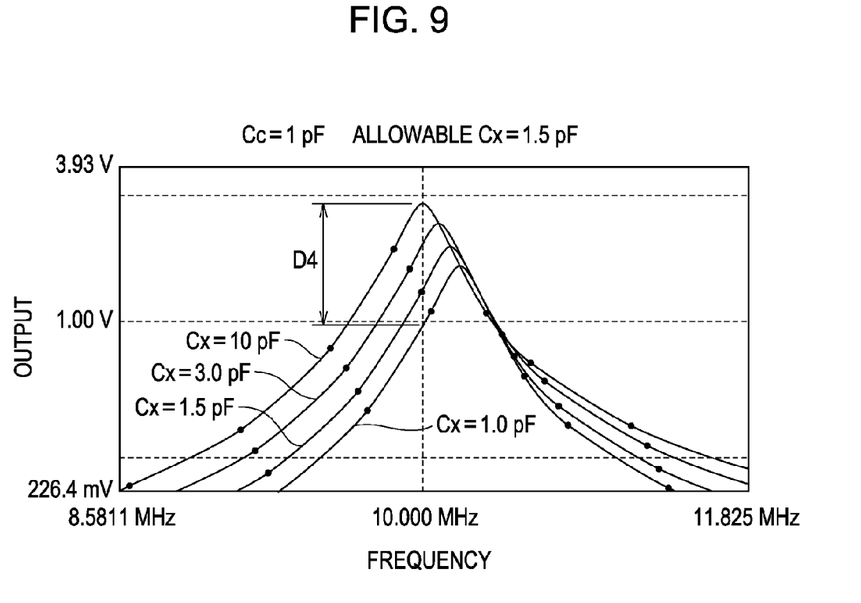
FIG. 9 is a view showing the output change caused by the fluctuation in the capacitance Cx of the receiver.

The output change caused by the fluctuation in the capacitance Cx between the human body 1 and the reception electrode 21 (corresponding to the distance between the transmission medium and the reception electrode) was studied with respect to the circuit shown in FIG. 1B. The results are shown in FIGS. 7 to 9. The circuit shown in FIG. 1B provided with no coupling capacitor was subjected to the simulation. The simulation result is shown in FIG. 6. In this case, the frequency of the AC power source 24 was set to 10 MHz, and the amplitude was set to 1 Vpp.

FIG. 6 shows the frequency characteristic of the circuit provided with no coupling capacitor as the comparative example having the allowable Cx set to 9.45 pF. As FIG. 6 shows, the frequency reaches the peak value of 10.0 MHz with the capacitance Cx of 10 pF, and the output at the frequency of 10 MHz is 30 V. The frequency reaches the peak value of 10.14 MHz with the capacitance Cx of 9.7 pF, and the output at the frequency of 10 MHz is 21.7 V. The frequency reaches the peak value of 10.3 MHz with the capacitance Cx of 9.45 pF, and the output at the frequency of 10 MHz is 14.8 V. The frequency reaches the peak value of 10.4 MHz with the capacitance Cx of 9.1 pF, and the output at the frequency of 10 MHz is 9.5 V. An output difference D1 between the case with the capacitance Cx of 10 pF and the case with the capacitance Cx of 9.1 pF is 20.5 V. The output at the frequency of 10 MHz becomes half the value in the normal state when the capacitance Cx is 9.45 pF. Accordingly, the allowable Cx value is 9.45 pF.

FIG. 7 shows the frequency characteristics of the circuit according to the example when the capacity of the coupling capacitor Cc is set to 30 pF, and the allowable Cx is set to 9.1 pF. Referring to FIG. 7, the frequency reaches the peak value of 10.0 MHz with the capacitance Cx of 10 pF, and the output at the frequency of 10 MHz is 22.5 V. The frequency reaches the peak value of 10.13 MHz with the capacitance Cx of 9.5 pF, and the output at the frequency of 10 MHz is 16.5 V. The frequency reaches the peak value of 10.23 MHz with the capacitance Cx of 9.1 pF, and the output at the frequency of 10 MHz is 1.3 V. The frequency reaches the peak value of 10.35 MHz with the capacitance Cx of 8.7 pF, and the output at the frequency of 10 MHz is 8.2 V. An output difference D2 between the case with the capacitance Cx of 10 pF and the case with the capacitance of Cx of 8.7 pF is 14.3 V. The output at the frequency of 10 MHz becomes half the value in the normal state when the capacitance Cx is 9.1 pF. Accordingly, the allowable capacitance Cx is 9.1 pF. In the circuit according to the example, the change in the output caused by the gap between the human body and the reception electrode is small. In other words, the width of the gap which provides the output for enabling the communication may be extended. The circuit of the example is capable of performing the stable communication in spite of the extended distance between the transmission medium and the reception electrode.

FIG. 8 shows the frequency characteristic of the circuit according to the example having the capacity of the coupling capacitor Cc set to 3 pF, and the allowable capacitance Cx set to 5.0 pF. Referring to FIG. 8, the frequency reaches the peak value of 10.0 MHz with the capacitance Cx of 10 pF, and the output at the frequency of 10 MHz is 6.93 V. The frequency reaches the peak value of 10.09 MHz with the capacitance Cx of 7.0 pF, and the output at the frequency of 10 MHz is 5.42 V. The frequency reaches the peak value of 10.20 MHz with the capacitance Cx of 5.0 pF, and the output at the frequency of 10 MHz is 3.48 V. The frequency reaches the peak value of 10.27 MHz with the capacitance Cx of 4.0 pF, and the output at the frequency of 10 MHz is 2.55 V. An output difference D3 between the case with the capacitance Cx of 10 pF and the case with the capacitance Cx of 4.0 pF is 4.38 V.

FIG. 9 shows the frequency characteristic of the circuit according to the example having the capacity of the coupling capacitor Cc set to 1 pF, and the allowable capacitance Cx set to 1.5 pF. Referring to FIG. 9, the frequency reaches the peak value of 10.0 MHz with the capacitance Cx of 10 pF, and the output at the frequency of 10 MHz is 2.7 V. The frequency reaches the peak value of 10.07 with the capacitance Cx of 3.0 pF, and the output at the frequency of 10 MHz is 2.1 V. The frequency reaches the peak value of 10.14 MHz with the capacitance Cx of 1.5 pF, and the output at the frequency of 10 MHz is 1.34 V. The frequency reaches the peak value of 10.19 MHz with the capacitance Cx of 1.0 pF, and the output at the frequency of 10 MHz is 0.96 V. An output difference D4 between the case with the capacitance Cx of 10 pF and the case with the capacitance Cx of 1.0 pF is 1.74 V. The output at the frequency of 10 MHz becomes half the value in the normal state when the capacitance Cx is 1.5 pF, and accordingly the allowable capacitance Cx is 1.5 pF.

Figure 10A:
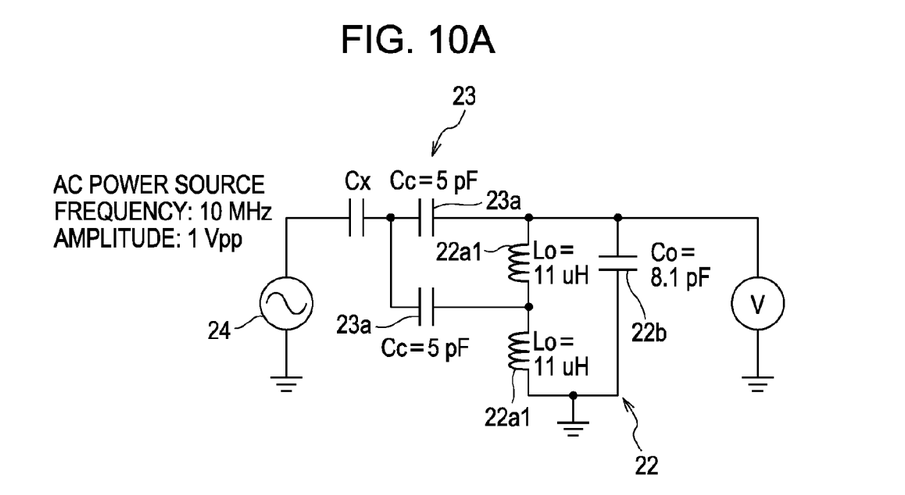
FIGS. 10A and 10B are views each showing another example of an equivalent circuit as a part of the communication system at the receiver side.
Figure 10B:
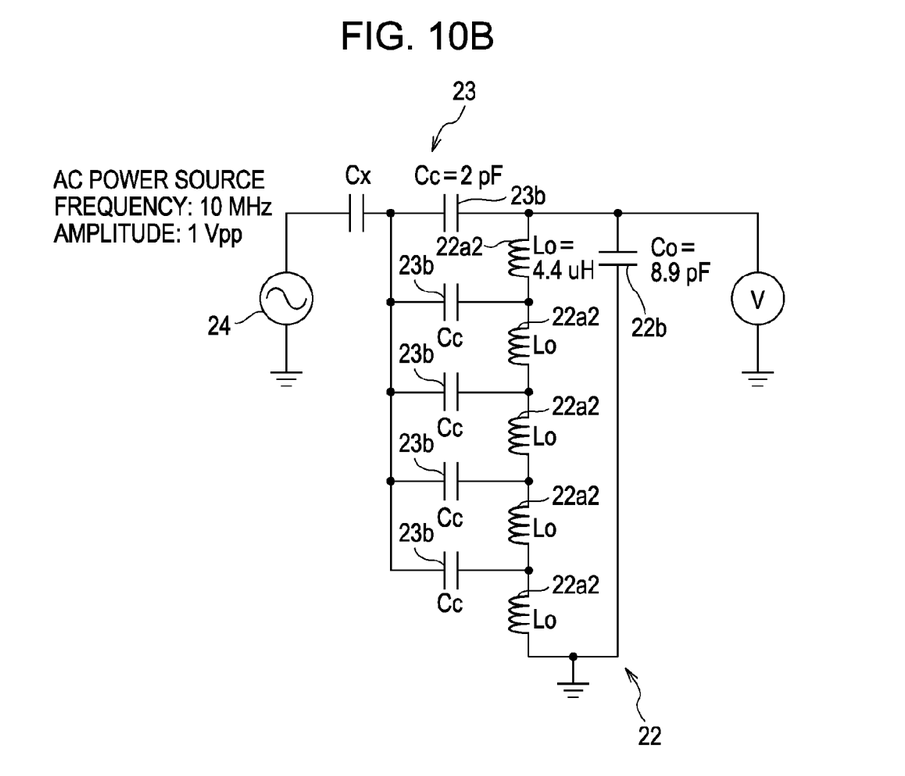

The resonance circuit 22 shown in FIG. 1B is formed of one resonance inductor 22a and one resonance capacitor 22b. The present invention is not limited to the aforementioned structure. Referring to FIGS. 10A and 10B, the resonance circuit 22 may include plural resonance inductors capacitively coupled with the reception electrode 21. This makes it possible to further reduce the frequency shift amount caused by fluctuation of the distance between the transmission medium and the reception electrode, thus extending the distance therebetween. The division number of the resonance inductor is not limited.

FIG. 10A represents the case where the resonance inductor is divided into two parts. In this case, the resonance inductor of the resonance circuit is formed of two resonance inductors 21a1 and 22a1 each with inductance of 11 µH connected in series (two-part type). The coupling capacitor 23 is divided into two coupling capacitors 23a, 23a each with the capacity of 5 pF connected in parallel so as to be connected to the resonance inductor. The capacity of the resonance capacitor is set to 8.1 pF such that the resonance frequency becomes 10 MHz in the normal state where the Cx is set to 10 pF.

In the circuit shown in FIG. 10B, the resonance inductor is divided into five parts (five-part type). In this case, the coupling capacitor 23 is formed of five coupling capacitors 23b, 23b, 23b, 23b, 23b each with the capacity of 2 pF connected in parallel, and the resonance inductor is formed of five resonance inductors 22a2, 22a2, 22a2, 22a2, 22a2 each with the inductance of 4.4 μH connected in series. In the aforementioned case, the capacity of the resonance capacitor is set to 8.9 pF such that the resonance frequency becomes 10 MHz in the normal state where Cx is set to 10 pF.

Figure 11A:
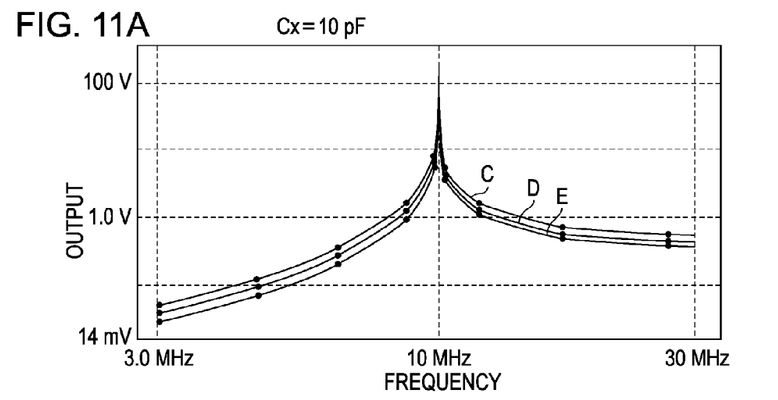
FIGS. 11A to 11C are views each showing the shift of the resonance frequency of the receiver.
Figure 11B:
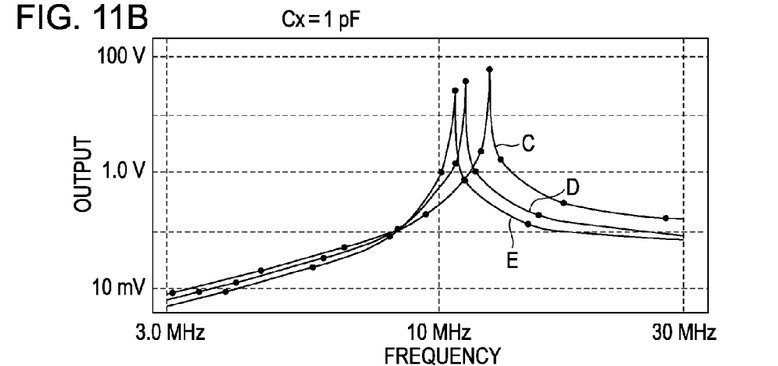
Figure 11C:
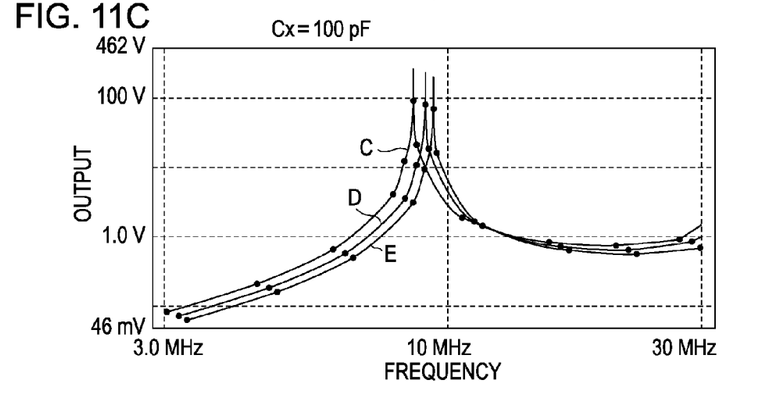

The simulation is conducted with respect to the effect of dividing the resonance inductor, and the results are shown in FIGS. 11A to 11C. The frequency of the AC power source 24 was set to 10 MHz, and the amplitude was set to 1 Vpp. In the normal state where Cx=10 pF, the resonance occurs at 10 MHz with the capacitance Cx of 10 pF in each case of the circuit with the resonance inductor which is not divided (characteristic curve C), the circuit with the resonance inductor divided into two parts (characteristic curve D), and the circuit with the resonance inductor divided into five parts (characteristic curve E). Each resonance frequency shift in the aforementioned three circuits when the capacitance Cx is set to 1 pF (gap larger than the one in the normal state) is shown in FIG. 11B. Referring to FIG. 11B, the larger the division number of the resonance inductor becomes, the less the frequency shift is suppressed. The resonance frequency shift when the capacitance Cx is set to 100 pF (gap smaller than the one in the normal state) is shown in FIG. 11C. As shown in FIG. 11C, the larger the division number of the resonance inductors becomes, the less the frequency shift is suppressed.

Figure 12A:
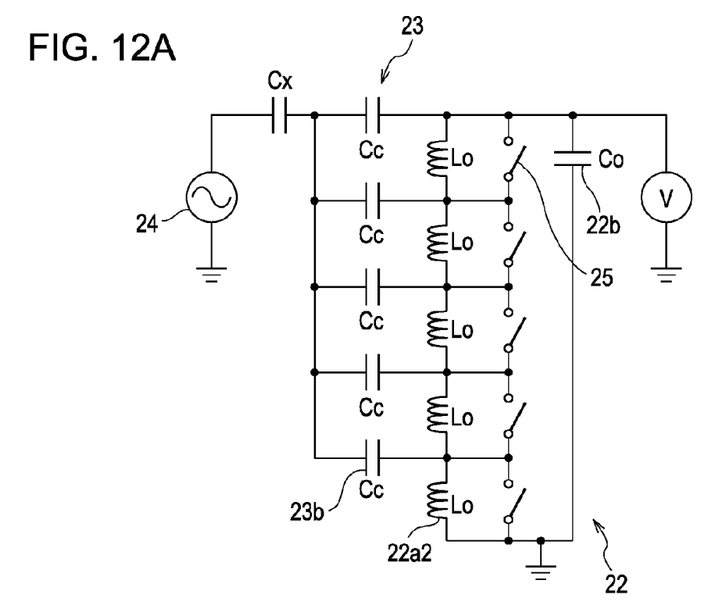
FIGS. 12A and 12B are views each showing another example of the equivalent circuit as a part of the communication system at the receiver side.

The resonance circuit 22 may be structured such that each of the plural resonance inductors is provided with a selector switch 25 for allowing the resonance frequency in the resonance circuit 22 to be changed.

Figure 12B:
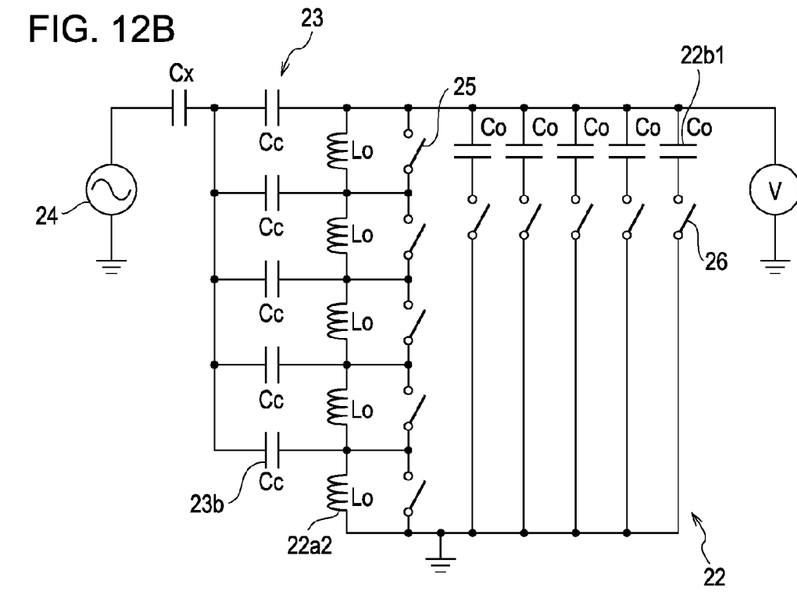

The resonance circuit 22 may be structured to divide the resonance capacitor 22b into plural capacitors 22b1, and to provide selector switches 25, 26 for the resonance inductor and/or the resonance capacitor as shown in FIG. 12B. The resonance circuit 22 is capable of controlling the inductance and the capacity separately so as to change not only the resonance frequency but also the Q-value independently. For example, the inductance of the resonance inductor is increased to make the Q-value large while maintaining the same resonance frequency. Conversely, the capacity of the resonance capacitor is increased to make the Q-value small. Specifically, if the noise is required to be eliminated, the Q-value is made larger. If the communication speed is accelerated by increasing the band, the Q-value is made smaller. The structure shown in FIG. 12B is capable of executing the aforementioned control. Each of the structures shown in FIGS. 12A and 12B provides the switch for each resonance inductor or the resonance capacitor. However, in the present invention, only one switch may be provided with respect to at least two units of the resonance inductors or the resonance capacitors.

The specific structure of the aforementioned coupling capacitor will be described.

Figure 13A:
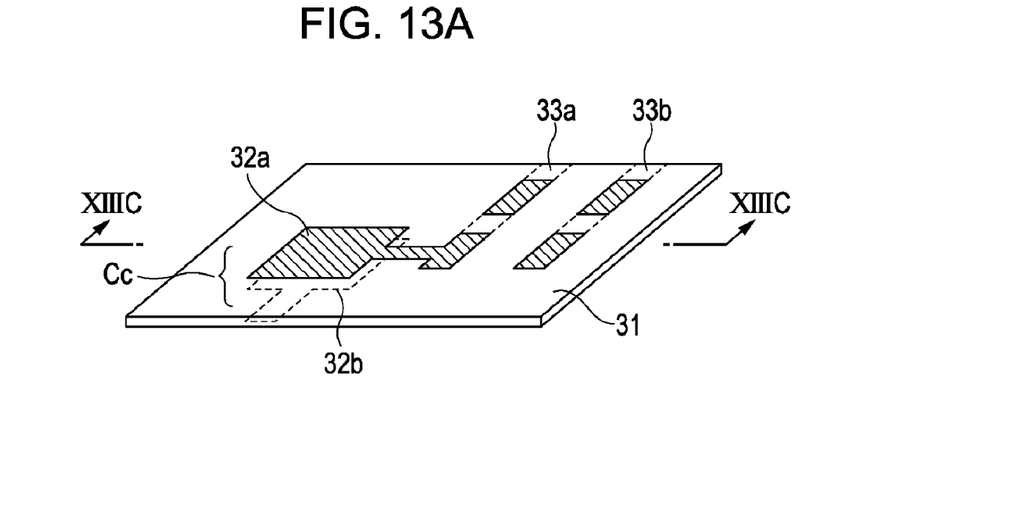
FIG. 13A is a view showing a pattern on the circuit substrate.
Figure 13B:
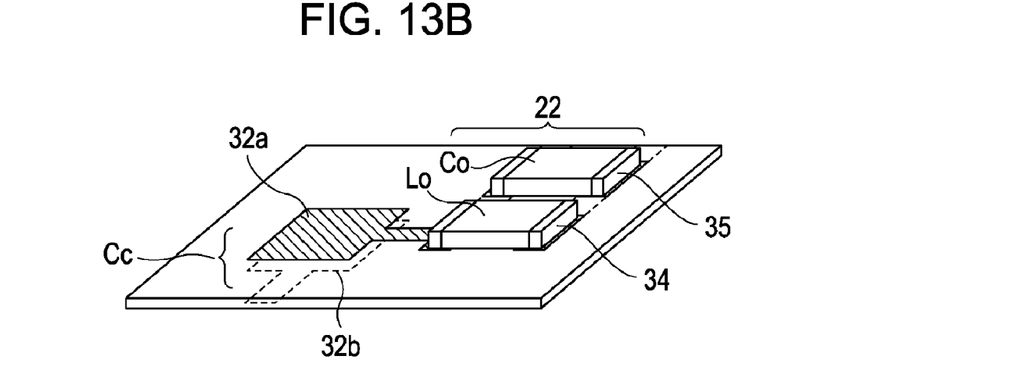
FIG. 13B is a view showing the state where the electronic element is mounted on the pattern.
Figure 13C:
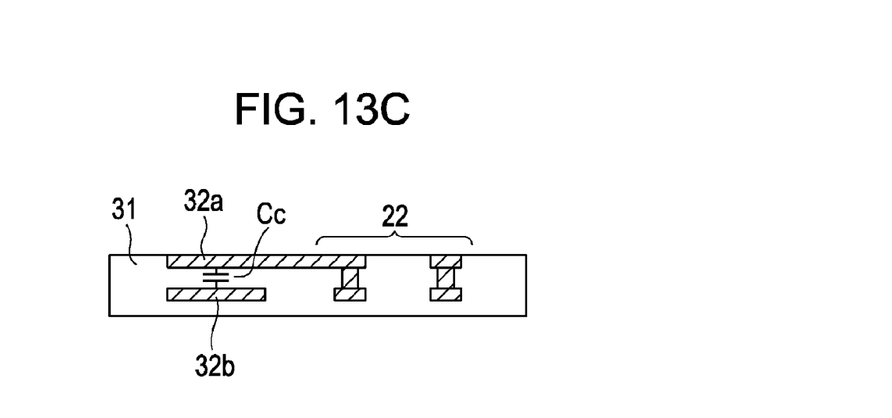
FIG. 13C is a sectional view taken along line XIIIC-XIIIC shown in FIG. 13A.

FIGS. 13A to 13C show structures of the receiver in the communication system according to the example of the present invention. FIG. 13A shows a pattern on the substrate. FIG. 13B is a view showing an electronic element mounted on the pattern. FIG. 13C is a sectional view taken along line XIIIC-XIIIC of FIG. 13A.

In the structure shown in FIG. 13A, patterns 32a, 32b for the coupling capacitor Cc and patterns 33a, 33b for the resonance circuit are formed on a circuit substrate 31. The pattern 32a for the coupling capacitor Cc corresponds to the resonance circuit side electrode (second electrode), and the pattern 32b corresponds to the receiver side electrode (first electrode). The pattern 33a for the resonance circuit corresponds to the one at the demodulation circuit side, and the pattern 33b corresponds to the one at the ground side. The coupling capacitor Cc is formed between the receiver side electrode 32b and the resonance circuit side electrode 32a, one of which (in this case, the resonance circuit side electrode 32a) is formed on the circuit substrate 31. In this way, the coupling capacitor Cc is built in the circuit substrate 31. The receiver side electrode 32b is connected to the reception electrode, the demodulation circuit side pattern 33a is connected to the demodulation circuit, and the ground side pattern 33b is connected to the ground.

FIG. 13B shows the state where a resonance inductor 34 and a resonance capacitor 35 are mounted on the patterns as shown in FIG. 13A. That is, the resonance inductor 34 is mounted on the demodulation circuit side pattern 33a and the ground side pattern 33b connected to the resonance circuit side electrode 32a. The resonance capacitor 35 is mounted on the demodulation circuit side pattern 33a and the ground side pattern 33b, which are not connected to the resonance circuit side electrode 32a. The resonance circuit 22 is formed of the thus connected resonance inductor 34 and the resonance capacitor 35. Respective locations of the resonance inductor 34 and the resonance capacitor 35 may be switched therebetween.

Generally the component for the resonance circuit is mostly required to have the fine adjustment function for adjusting the resonance frequency. Especially, the trimmer capacitor is used for the resonance capacitor in most of the case. Accordingly, it is not suitable for the element to be formed in the substrate. Meanwhile, as the capacity value of the coupling capacitor Cc can be determined by setting the distance within which the receiver can perform communication, it is suitable for the element to be formed on the substrate. The coupling capacitor Cc with the structure shown in FIGS. 13A to 13C is employed to stabilize the resonance frequency and to reduce the number of components. In the structure having the coupling capacitor Cc built in the circuit substrate 31, the number of the components may further be reduced by forming the resonance circuit in the integrated circuit such as the modulation circuit.

The specific structure when the resonance circuit side electrode is allowed to serve as the resonance inductor will be described.

Figure 14A:
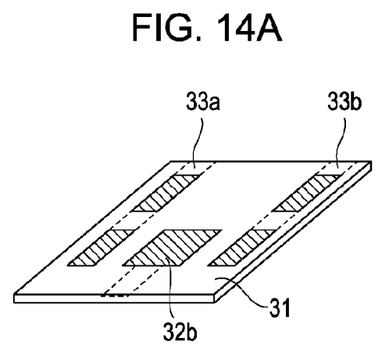
FIG. 14A is a view showing the pattern on the circuit substrate.
Figure 14B:
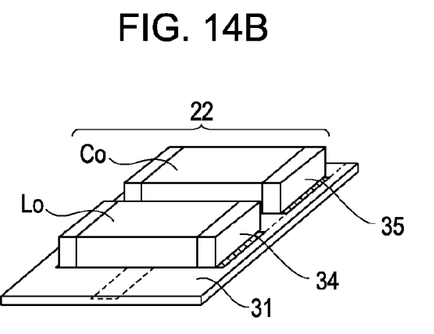
FIG. 14B is a view showing the state where the electronic element is mounted on the pattern.

As FIG. 14A shows, the receiver side electrode 32b of the coupling capacitor Cc is formed on the circuit substrate 31, and the demodulation circuit side pattern 33a and the ground side pattern 33b are formed at both sides of the electrode 32b. As FIG. 14B shows, the resonance inductor 34 and the resonance capacitor 35 are mounted on the demodulation circuit side pattern 33a and the ground side pattern 33b, respectively to form the resonance circuit 22. In the aforementioned structure, the resonance inductor 34 is located to face the receiver side electrode 32b such that the coupling capacitor Cc is formed between the receiver side electrode 32b and the resonance inductor 34 of the resonance circuit 22.

In the aforementioned structure, the wiring in the resonance inductor 34 and the receiver side electrode 32b formed on the circuit substrate 31 are capacitively coupled to establish the distribution-constant coupling as shown in FIGS. 10A and 10B. This may provide the effect for further stabilizing the resonance frequency. In the aforementioned structure, the frequency shift amount is reduced so as to extend the distance within which the receiver can perform communication. The aforementioned structure eliminates the resonance circuit side electrode 32a, thus establishing the distribution constant coupling without increasing the number of components to be employed. In such a case, the material with high dielectric constant such as resin is filled between the circuit substrate 31 and the resonance inductor 34 so as to intensify the electrostatic coupling between the receiver side electrode 32b and the resonance inductor 34 as the resonance circuit side electrode. At this time, the adhesive agent may be employed as the material filled between the receiver side electrode 32b and the resonance inductor 34 so as to be adhered with each other. In the case where the resonance circuit is formed in the integrated circuit such as the demodulation circuit, the resonance circuit side electrode is allowed to serve as the resonance inductor in the integrated circuit, thus establishing the distribution-constant coupling to provide the similar effect.

Figure 15A:
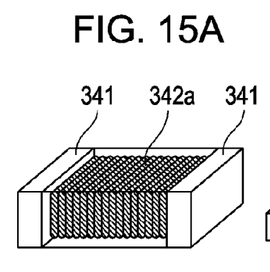
FIGS. 15A to 15F are views each showing an example of the resonance inductor used for the receiver.
Figure 15B:
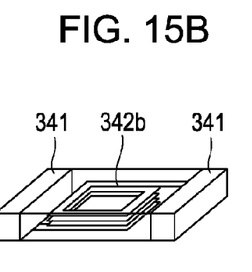
Figure 15C:
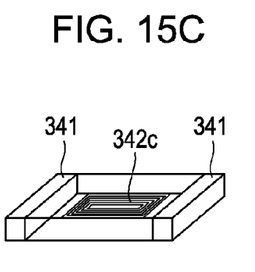
Figure 15D:
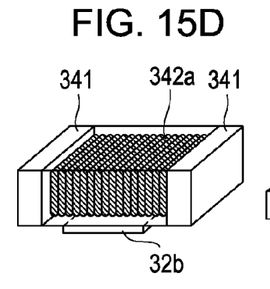
Figure 15E:
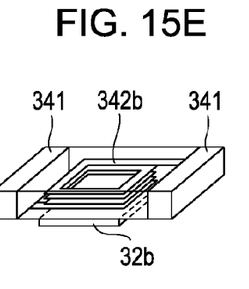
Figure 15F:
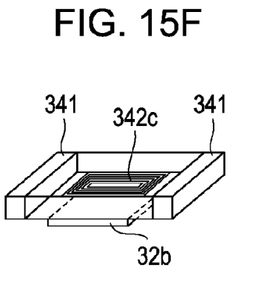

The wiring of the resonance inductor 34 may be structured as shown in FIGS. 15A to 15C. In any one of the structures, the distribution-constant coupling is established between the receiver side electrode 32b and the wiring in the resonance inductor 34 to provide the effect for stabilizing the resonance frequency. The receiver side resonance electrode 32b may be formed on the surface of the resonance inductor 34 as shown in FIGS. 15D to 15F rather than being formed on the circuit substrate 31 to establish the distribution-constant coupling between the receiver side electrode 32b and the wiring in the resonance inductor 34, thus providing the similar effect. The receiver side electrode 32b may be formed on the surface of the resonance inductor 34 as shown in FIGS. 15D to 15F so as to be mounted while being directed upward or sideways. This makes it possible to subject the receiver side electrode 32b to the wire bonding and the ball bonding.

Figure 16A:
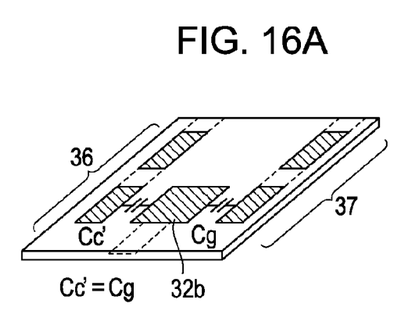
FIGS. 16A to 16D are views each showing a pattern on the circuit substrate of the receiver in the communication system according to the example of the present invention.
Figure 17:
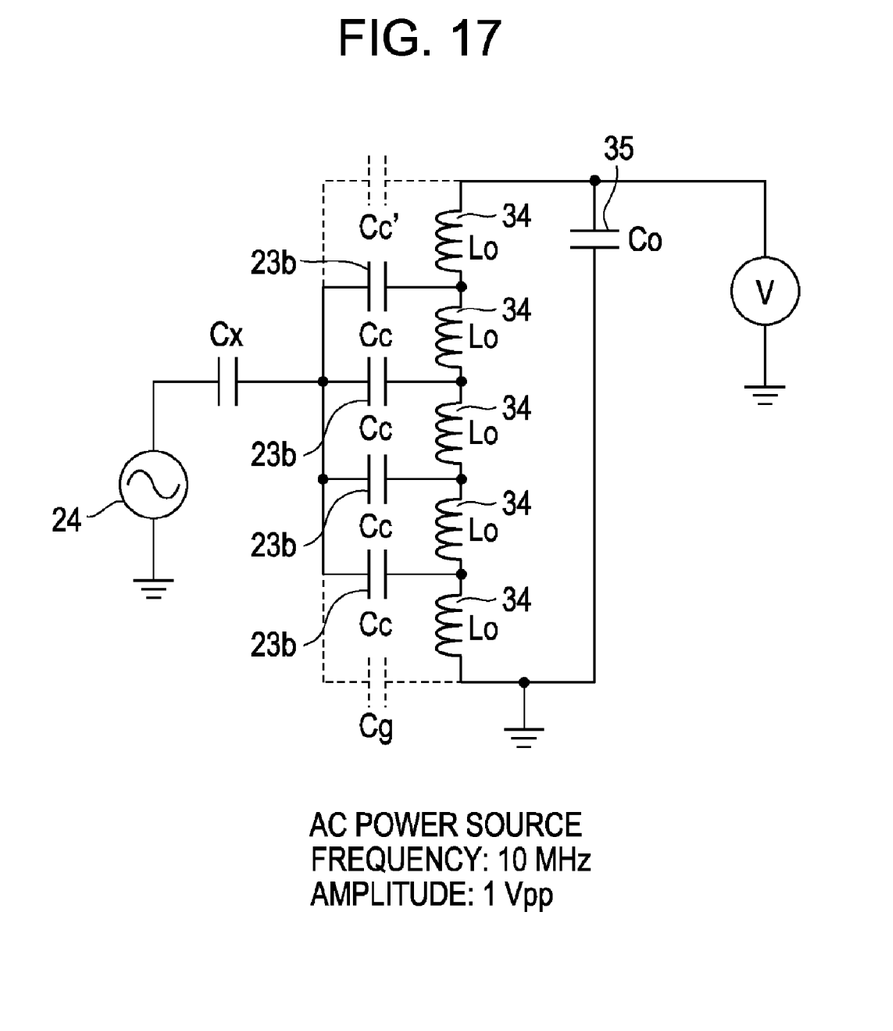
FIG. 17 shows a diagram of the equivalent circuit of the receiver with the pattern shown in FIG. 16A.

Referring to FIGS. 14A and 14B each showing the structure having the receiver side electrode 32b formed on the circuit substrate 31, and having the resonance inductor 34 serving as the resonance circuit side electrode 32a, the capacitance is generated between the resonance circuit side electrode and a demodulation circuit side wiring 36 connected to the demodulation circuit, and between the resonance circuit side electrode and a ground side wiring 37 connected to the ground of the demodulation circuit, respectively as shown in FIG. 16A. Assuming that the capacitance between the demodulation circuit side wiring 36 and the receiver side electrode 32b is designated as Cc', and the capacitance between the ground side wiring 37 and the receiver side electrode 32b is designated as Cg, the equivalent circuit in the aforementioned structure is represented as shown in FIG. 17.

Figure 16B:
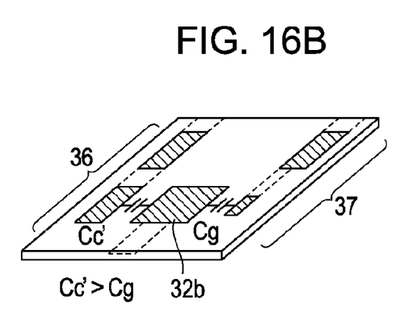
Figure 16C:
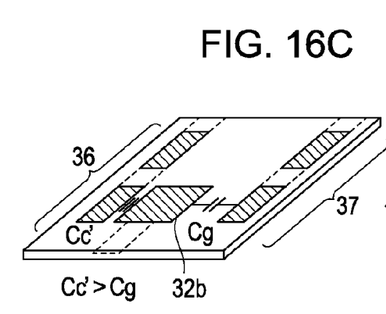
Figure 16D:
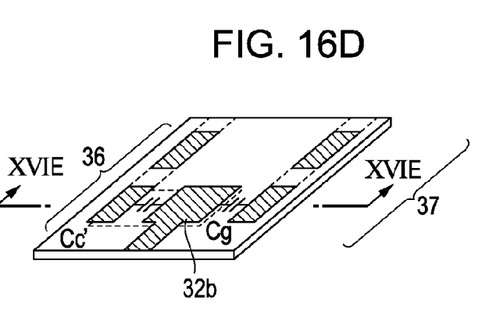
Figure 16E:
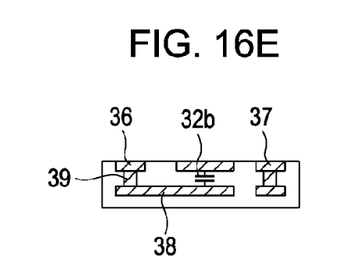
FIG. 16E is a sectional view taken along line XVIE-XVIE of FIG. 16D.

In the aforementioned structure, the demodulation circuit side wiring 36 and the ground side wiring 37 are formed on the circuit substrate 31 such that the capacitance Cc' becomes larger than the capacitance Cg. Specifically, in the structure shown in FIG. 16B, the region of the ground side wiring 37, which is adjacent to the receiver side electrode 32b is made small, and in the structure shown in FIG. 16C, the distance between the receiver side electrode 32b and the ground side wiring 37 is made larger than the distance between the receiver side electrode 32b and the demodulation circuit side wiring 36. Alternatively, in the multi-layer wiring substrate shown in FIGS. 16D and 16E, the demodulation circuit side wiring 36 may be connected to an inter-layer wiring 38 via a through hole 39 so as to increase the capacitance between the demodulation circuit side wiring 36 and the receiver side electrode 32b using the inter-layer capacity. The use of the aforementioned structure may suppress the signal from the reception side electrode 32b from being drawn into the ground, thus providing improved sensitivity.

In the case where the receiver side electrode 32b is formed on the resonance inductor 34, or both electrodes for forming the coupling capacitor are formed on the circuit substrate 31 besides the structures as described above, the demodulation circuit side wiring 36 and the ground side wiring 37 are formed such that the capacitance Cc' becomes larger than the capacitance Cg, thus providing the similar effect.

The present invention is not limited to the aforementioned examples, but may be formed into various structures. For example, the modulation circuit and the conversion circuit in the transmitter, and the detection circuit and the demodulation circuit in the receiver are not limited to those described in the examples and may be modified into various forms, respectively. The dimension and values in the examples are not limited but may be changed so as not to deviate from the scope of the present invention. The structure may be arbitrarily changed so long as it does not deviate from the scope of the present invention.

What is claimed is:

1. A communication system provided with a transmitter for applying a transmission signal to a transmission medium as an electric field, and a receiver for receiving the transmission signal by detecting the electric field via the transmission medium, wherein the receiver includes:
   a reception electrode located opposite the transmission medium;
   a resonance circuit provided on the circuit substrate, the resonance circuit being formed of a resonance inductor and a resonance capacitor;
   a coupling capacitor for capacitively coupling the reception electrode and the resonance circuit, the coupling capacitor having a first electrode at the reception electrode side formed on the circuit substrate;
   a demodulation circuit side wiring formed on the circuit substrate; and
   a ground side wiring formed on the circuit substrate;
   wherein the coupling capacitor is formed by a capacitive coupling between the first electrode at the reception electrode side and the resonance inductor, and has a capacitance which is equal to or smaller than a value of a capacitance between the receiver and the transmission medium when the receiver moves away from the transmission medium up to a maximum distance within which the receiver can perform communication,
   and wherein the demodulation circuit side wiring and the ground side wiring are formed such that a capacitance between the first electrode and the demodulation circuit wiring becomes larger than the capacitance between the first electrode and the ground side wiring.

2. The communication system according to claim 1, wherein the coupling capacitor is of variable capacitance type.

3. The communication system according to claim 1, wherein the resonance circuit includes plural resonance inductors capacitively coupled with the reception electrode.

4. The communication system according to claim 3, wherein each of the plural resonance inductors includes a switching member.

5. The communication system according to claim 3, wherein the resonance circuit includes the plural resonance capacitor, and each of the resonance inductors and/or the resonance capacitors has a switching member.

6. The communication system according to claim 1, wherein:
the resonance inductor is located at a position opposite the first electrode at the reception electrode side.

7. The communication system according to claim 1, wherein the resonance circuit has a standard resonance frequency set with respect to a standard capacitance between the reception electrode and the transmission medium corresponding to a predetermined standard distance between the receiver and the transmission medium,
and wherein the capacitance of the coupling capacitor is set such that a signal strength of the transmission signal at the standard resonance frequency received by the receiver at the maximum distance from the communication medium is about a half of a signal strength of the transmission signal at the standard resonance frequency received by the receiver at the standard distance from the communication medium.

8. A communication system comprising:
a transmitter for applying a transmission signal to a transmission medium as an electric field; and
a receiver for receiving the transmission signal by detecting the electric field via the transmission medium, the receiver including:
a reception electrode facing the transmission medium;
a resonance circuit formed on the circuit substrate, the resonance circuit including a resonance inductor and a resonance capacitor;
a coupling capacitor for capacitively coupling the reception electrode and the resonance circuit, the coupling capacitor having a first electrode at the reception electrode side formed on the circuit substrate;
a demodulation circuit side wiring formed on the circuit substrate;
a ground side wiring formed on the circuit substrate;
wherein the communication system has a maximum distance between the reception electrode and the transmission medium within which the receiver is capable of communicating,
wherein the coupling capacitor has a capacitance which is equal to or smaller than a capacitance between the reception electrode and the transmission medium at the maximum distance,
and wherein the demodulation circuit side wiring and the ground side wiring are formed such that a capacitance between the first electrode and the demodulation circuit wiring becomes larger than the capacitance between the first electrode and the ground side wiring.

9. The communication system according to claim 8, wherein the resonance circuit has a standard resonance frequency set with respect to a standard capacitance between the reception electrode and the transmission medium corresponding to a predetermined standard distance between the receiver and the transmission medium,
and wherein the capacitance of the coupling capacitor is set such that a signal strength of the transmission signal at the standard resonance frequency received by the receiver at the maximum distance from the communication medium is about a half of a signal strength of the transmission signal at the standard resonance frequency received by the receiver at the standard distance from the communication medium.

* * * * *